United States Patent [19]

Riegler et al.

[11] 4,224,836

[45] Sep. 30, 1980

[54] TILTING DRIVE ARRANGEMENT FOR A CONVERTER

[75] Inventors: Ernst Riegler, Enns; Manfred Schmidt, Linz, both of Austria

[73] Assignee: Voest-Alpine Aktiengesellschaft, Linz, Austria

[21] Appl. No.: 917,904

[22] Filed: Jun. 22, 1978

[30] Foreign Application Priority Data

Jul. 5, 1977 [AT] Austria .................................. 4777/77

[51] Int. Cl.² .............................................. F16H 37/06
[52] U.S. Cl. .................. 74/665 GC; 74/411; 74/414; 266/245
[58] Field of Search ......... 74/665 L, 665 M, 665 GC, 74/665 R, 665 GA, 410, 411, 414, 420, 412 R; 266/245, 246, 247

[56] References Cited

U.S. PATENT DOCUMENTS

| | | | |
|---|---|---|---|
| 3,390,585 | 7/1968 | Henne | 74/411 |
| 3,440,900 | 4/1969 | Neal | 74/665 M |
| 3,459,068 | 8/1969 | Mahringer et al. | 266/245 |
| 3,936,102 | 2/1976 | Riegler et al. | 266/245 X |

FOREIGN PATENT DOCUMENTS 1433488  5/1975  Fed. Rep. of Germany .......... 266/245

Primary Examiner—Peter P. Nerbun
Attorney, Agent, or Firm—Brumbaugh, Graves, Donohue & Raymond

[57] ABSTRACT

A tilting drive arrangement for a converter has a spur gear wheel fastened to a tilting trunnion of the converter and engaging with at least two pinions driven by a common motor. At least one shaft is provided for a common rotation of the pinions. The pinions are mounted in a carrying gear casing that is overmounted on the trunnion in a position outside the horizontal plane extending through the tilting axis of the converter. A torsionally elastic shaft between the pinions or a pivotally mounted reduction gear on each pinion are provided to produce a uniform torque distribution to the pinions.

7 Claims, 6 Drawing Figures

TILTING DRIVE ARRANGEMENT FOR A CONVERTER

BACKGROUND OF THE INVENTION

The invention relates to a tilting device for converters having a spur gear wheel fastened to a tilting trunnion and on which wheel at least two pinions, driven by a common motor and connected by a shaft, engage.

Tilting drives of this kind have already been known and are called Bogiflex-drives. With these drives each pinion is mounted by means of a car guided on an inner flange of the spur gear wheel and arranged diametrically opposite each other in the horizontal plane extending through the tilting trunnion axis. The cars are held together by a rod linkage and each car is torque-supported against the base by a rod linkage. This known arrangement has the disadvantage that only two pinions can be provided on the spur gear wheel in the described diametrical arrangement, which is insufficient for heavy drives. For heavy drives used for the transmission of large torques, more than two pinions are necessary. Another disadvantage of the diametrical arrangement is that the pinions, the holding means and the rod linkage lie relatively high above the working platform, thus restricting the space.

SUMMARY OF THE INVENTION

The invention aims at avoiding the described disadvantages and difficulties and has as its object to provide a tilting drive with at least two drive pinions and a torque division which, on the one hand, can be arranged below the working platform if only two pinions are required, thus saving space, and on the other hand, can comprise also more than two pinions for heavy drives. Furthermore, the invention aims at providing a compact construction that is operationally safe and is not liable to disturbances.

The object is achieved in that the pinions are mounted in a carrying drive casing overmounted on the tilting trunnion in a position outside the horizontal plane extending through the tilting axis of the converter.

Further advantages achieved in this manner are encasement against influences from the outside (dust, etc.), and the possibility of being able to use a circular lubrication system with oil, instead of a grease lubrication system.

According to a preferred embodiment two pinions are oppositely mounted in the drive casing below the horizontal plane extending through the tilting axis, the drive motor being arranged on the base and connected to one pinion, each via a bevel gearing.

In this case, the drive motor suitably is connected with one pinion each via at least one torsionally elastic shaft. The tooth plays of each drive chain are thus balanced out, so that both pinions participate equally in the torque transmission.

Advantageously, in another embodiment each pinion is driven via a separate reduction gear, each gear being mounted on the gear casing so as to be pivotable about the respective pinion axis. The reduction gears are motion-coupled to each other, for instance via a ball and socket mounting or a toothing and the bevel gears are each drive-connected with the reduction gears via a universal joint propeller shaft. With this arrangement, the tooth plays are balanced out by a movement of the reduction gears relative to the gear casing.

According to a further preferred embodiment, two opposed pinions are each arranged below and above the horizontal plane extending through the tilting axis. The pinions, which are arranged one above the other are connected by torsionally elastic shafts.

BRIEF DESCRIPTION OF THE DRAWINGS

The invention shall be explained in more detail by way of several embodiments and with reference to the accompanying drawings, wherein.

DESCRIPTION OF PREFERRED EMBODIMENTS

Figure 1:
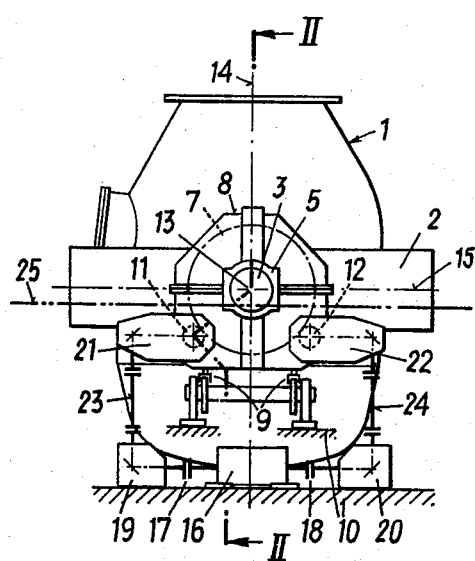
FIGS. 1, 3 and 4 are each schematic side views of separate embodiments of tilting drives having two drive pinions.

A converter 1 is inserted in a carrying ring 2. The carrying ring is connected with tilting trunnions 3, 4, which are mounted in bearings 5, 6, so that the ring is fixed against rotation with respect to the trunnions. The tilting trunnion 3 is elongated beyond the bearing 5. On its end a spur gear wheel 7 is provided so as to be secured against rotation with respect to the trunnion. The spur gear wheel is enclosed in a gear casing 8 which is supported via a torque support 9 on the base 10 and is overmounted on the tilting trunnion 3.

Two pinions 11, 12 are mounted in the gear causing 8 symmetrically with respect to the vertical plane 14 extending through the tilting axis 13 of the converter and below the horizontal plane 15, which also extends through the tilting axis 13, so that they mesh with the spur gear wheel 7.

The two pinions 11, 12 are commonly driven by a single drive motor 16, which preferably is a rotary current motor. The drive motor 16 is arranged on the base 10 and, via two couplings 17, 18 and two bevel gears 19, 20, drives reduction gears 21, 22, each placed before one pinion. Between each of the bevel gears 19, 20 and each of the reduction gear 21, 22, torsionally elastic shafts 23, 24 are provided. The torsion elasticity of each shaft is greater than the sum of the tooth plays of the drive chain starting from the motor 16 and leading to the spur gear wheel 7.

Figure 3:
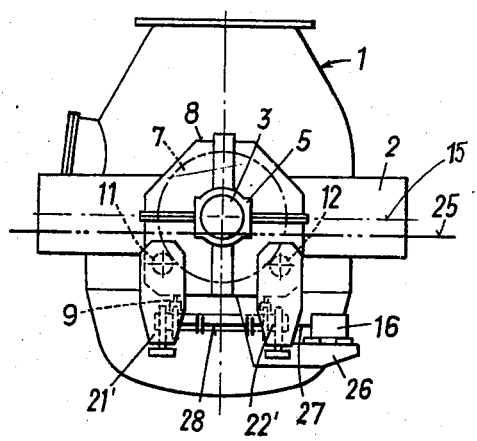
Figure 2:
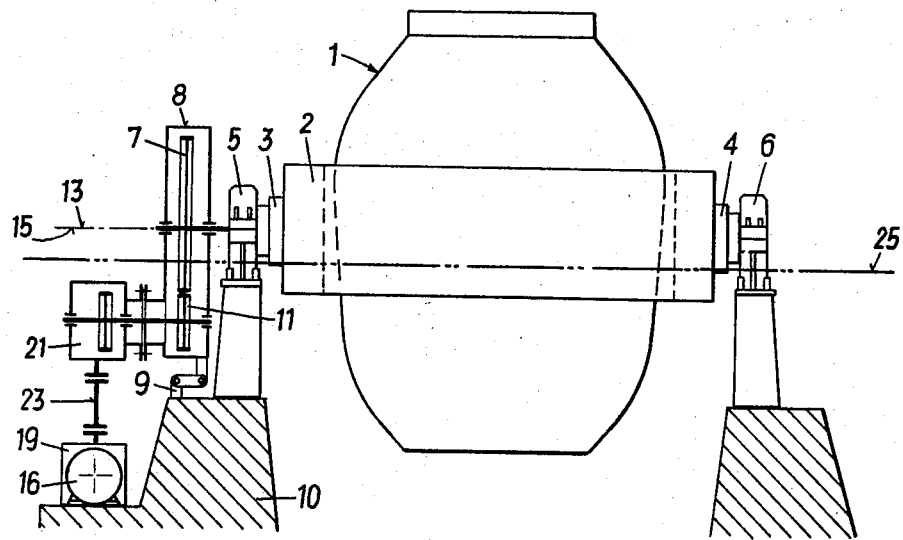
FIGS. 2 and 5 show sections along lines II—II and V—V, respectively, of FIGS. 1 and 4.

As can be seen from FIG. 1, the reduction gears each lie below a working platform denoted by 25, so that the latter will not be restricted in space by any drive elements, except for the gear casing 8. According to FIG. 3, the drive motor is arranged on a console 26 fastened to the gear casing 8. Driving is effected from the drive motor via a shaft 27 to the reduction gear 22' and from there, via a torsionally elastic shaft 28, to the second reduction gear 21'.

Figure 4:
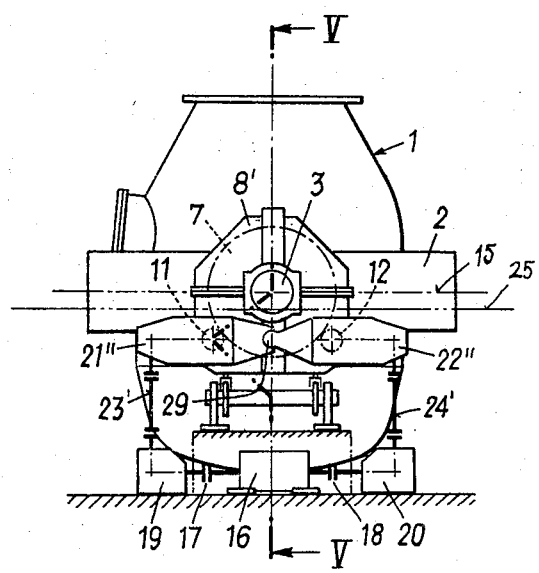
Figure 5:
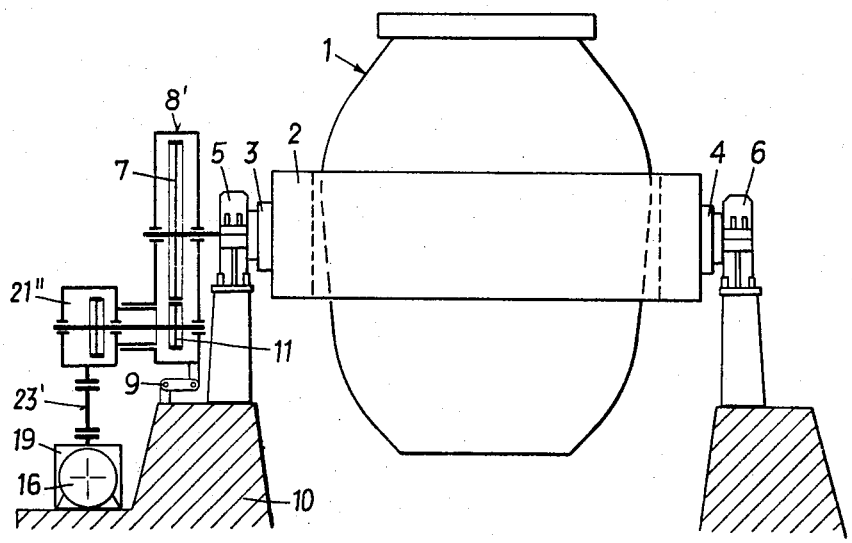

According to the embodiments illustrated in FIGS. 4 and 5, the reduction gears 21'', 22'', which embodiment otherwise is the same as that shown in FIG. 1, are mounted on the gear casing 8' so as to be pivotable about the axes of the pinions 11, 12 and coupled together by a ball and socket bearing 29, whereby the tooth plays of each drive chain can be balanced out by a reverse rotational movement of the reduction gears 21'', 22'', relative to the gear casing 8. Instead of the ball and socket bearing, another type of coupling of the reduction gears 21'' and 22'' also be provided, for instance a toothing. No torsionally elastic shaft need be provided between the bevel gears and the reduction gears. In this case simple universal joint propeller shafts will suffice.

Figure 6:
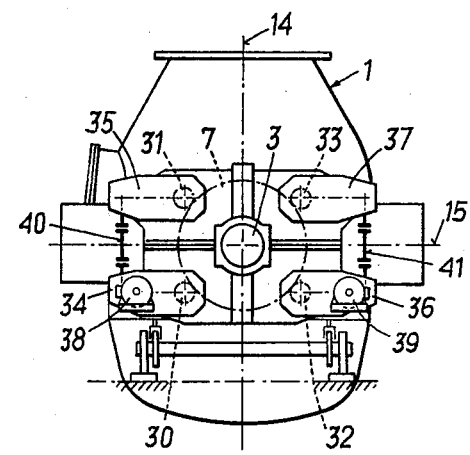
FIG. 6 illustrates in side view an embodiment of a heavy drive having four drive pinions.

In FIG. 6 a tilting drive for particularly heavy converters is illustrated in which four pinions 30, 31, 32, 33 are provided, which are arranged symmetrically with respect to the vertical plane 14 and the horizontal plane 15 that extend through the tilting axis. Each pinion is provided with a reduction gear 34 to 37 flanged to the gear casing, the reduction gears 34, 35 and 36, 37, each lying one above the other and being drivable by means of drive motors 38, 39, respectively, fastened to the gear casing 8. Each of the drive motors 38, 39 at first is directly flanged to a reduction gear 34, 36, which in turn is drive-connected, via a torsionally elastic shaft 40 and 41, respectively, to the reduction gear 35 and 37, respectively, arranged thereabove.

What we claim is:

1. In a tilting drive arrangement for a converter with a tilting trunnion and a gear casing overmounted on said tilting trunnion, said tilting drive arrangement including a spur gear wheel mounted on said tilting trunnion and surrounded by said gear casing, at least two pinions meshing with said spur gear wheel and arranged within said gear casing in a plane outside the horizontal plane extending through the tilting axis of the converter, shaft means provided for a common rotation of said at least two pinions, a torque support provided to support said gear casing, and a drive motor commonly driving said at least two pinions via said shaft means, the improvement comprising said shaft means including torsionally elastic members, said torsionally elastic members separating the drives to said pinions for providing a uniform torque distribution between the pinions and a balancing of different tooth plays of said pinions.

2. A tilting drive arrangement as set forth in claim 1, wherein two pinions are opposingly mounted within said gear casing below said horizontal plane extending through said tilting axis, and further comprising
    a base, said drive motor being arranged on said base, and
    two bevel gears, each bevel gear being provided intermediate said drive motor and one of said two pinions, each pinion being connected to the drive motor via respective torsionally elastic members and bevel gears.

3. A tilting drive arrangement as set forth in claim 1, wherein said shaft means include a pair of torsionally elastic shafts and wherein two first pinions are arranged above said horizontal plane and two second pinions are arranged below said horizontal plane and opposite said two first pinions, said two first pinions being arranged above said two second pinions and connected with said two second pinions by said pair of torsionally elastic shafts.

4. In a tilting drive arrangement for a converter with a tilting trunnion and a gear casing overmounted on said tilting trunnion, said tilting drive arrangement including a spur gear wheel mounted on said tilting trunnion and surrounded by said gear casing, at least two pinions meshing with said spur gear wheel being arranged within said gear casing in a plane outside of the horizontal plane extending through the tilting axis of the converter, a drive motor being provided to commonly drive said two pinions, shaft means being provided for a common rotation of said at least two pinions and a torque support being provided to support said gear casing, the improvement comprising
    at least two reduction gears, each reduction gear driving one of said at least two pinions and being mounted on said gear casing so as to be pivotable about the respective pinion axis, said at least two reduction gears being motion-coupled to each other;
    at least two bevel gears; and
    shaft members of said shaft means being provided for each of said at least two bevel gears, each reduction gear being drive-connected to the drive motor via a shaft member and a bevel gear.

5. A tilting drive arrangement as set forth in claim 4, wherein said reduction gears are motion-coupled via a ball and socket bearing.

6. A tilting drive arrangement as set forth in claim 4, wherein said reduction gears are motion-coupled via a toothing.

7. A tilting drive arrangement as set forth in claim 4 wherein said shaft members are torsionally elastic members.

* * * * *